(12) United States Patent
Saban

(10) Patent No.: US 8,190,332 B2
(45) Date of Patent: May 29, 2012

(54) INTELLIGENT CHILD SAFETY SEAT

(76) Inventor: Asher S. Saban, Halfa (IL)

( * ) Notice: Subject to any disclaimer, the term of this patent is extended or adjusted under 35 U.S.C. 154(b) by 250 days.

(21) Appl. No.: 12/456,368

(22) Filed: Jun. 16, 2009

(65) Prior Publication Data

US 2009/0259369 A1    Oct. 15, 2009

Related U.S. Application Data

(63) Continuation of application No. PCT/IL2007/001625, filed on Dec. 30, 2007.

(30) Foreign Application Priority Data

Dec. 31, 2006    (IL) .......................................... 180462

(51) Int. Cl.
    *B60R 22/48*    (2006.01)
    *A47C 7/62*    (2006.01)
    *G08B 23/00*    (2006.01)

(52) U.S. Cl. ..................... 701/45; 340/573.1; 297/217.3

(58) Field of Classification Search .................. 297/238, 297/250.1, 217.3; 340/425.5, 457, 573.1, 340/568.2; 180/273, 271; 701/45, 1, 36; 280/658, 647, 640, 748
    See application file for complete search history.

(56) References Cited

U.S. PATENT DOCUMENTS

| | | | | |
|---|---|---|---|---|
| 5,515,933 A | * | 5/1996 | Meyer et al. | .................. 180/273 |
| 5,851,026 A | * | 12/1998 | Schoos et al. | .................. 280/735 |
| 5,882,035 A | * | 3/1999 | Munro | .......................... 280/735 |
| 7,218,218 B1 | * | 5/2007 | Rogers | .......................... 340/522 |
| 7,233,239 B2 | | 6/2007 | Chitalia et al. | |
| 2004/0113797 A1 | | 6/2004 | Osborne | |
| 2004/0164856 A1 | | 8/2004 | Mesina | |
| 2005/0033634 A1 | * | 2/2005 | Pugliese, III | ................... 705/13 |
| 2005/0264061 A1 | * | 12/2005 | Mack et al. | ................. 297/250.1 |
| 2005/0278097 A1 | | 12/2005 | Patterson et al. | |
| 2005/0280297 A1 | | 12/2005 | Patterson et al. | |

(Continued)

FOREIGN PATENT DOCUMENTS

WO    WO 2005/102771 A2    11/2005

OTHER PUBLICATIONS

Search Report mailed Jun. 13, 2008 issued by the International Searching Authority in counterpart International Application No. PCT/IL2007/001625 (3 pages).

*Primary Examiner* — Thomas Black
*Assistant Examiner* — Christine Behncke
(74) *Attorney, Agent, or Firm* — Holtz, Holtz, Goodman & Chick, PC

(57) ABSTRACT

An intelligent child safety seat, or ICSS, having an electronic unit loaded with manufacturer's specifications particular to the ICSS, or ICSS-data, configured for communication of at least one item of datum to vehicle systems via a joint interface. The ICSS-data support provision of seat installation instructions, detection of possible incompatibilities, detection of the presence of a child and disposition of the ICSS in the vehicle seat, detection of misuse and of inappropriate reuse after a crash or after the expiration date, a check to detect if the ICSS is included in product recall announcements, and multiple safety applications carried out by vehicle systems. The electronic unit further includes at least one module consisting of an I/O module, a sensors module, and a devices module. A communication interface of the ICSS and of the vehicle may be implemented in top tether arrangements.

20 Claims, 5 Drawing Sheets

U.S. PATENT DOCUMENTS

| | | |
|---|---|---|
| 2006/0049677 A1 | 3/2006 | Lawrence et al. |
| 2006/0049929 A1 | 3/2006 | Lawrence et al. |
| 2006/0111821 A1* | 5/2006 | Wallner et al. ............ 701/29 |
| 2006/0139159 A1* | 6/2006 | Lee et al. ............ 340/457 |
| 2006/0229784 A1* | 10/2006 | Bachmann et al. ............ 701/45 |
| 2006/0273917 A1 | 12/2006 | Rams, Jr. |
| 2007/0057799 A1 | 3/2007 | Monzo et al. |
| 2007/0085394 A1 | 4/2007 | Yang |
| 2007/0222622 A1 | 9/2007 | Sweeney |
| 2007/0294013 A1 | 12/2007 | Rieth et al. |
| 2008/0121757 A1* | 5/2008 | Pozzi et al. ............ 244/118.6 |
| 2009/0027188 A1 | 1/2009 | Saban |

* cited by examiner

INTELLIGENT CHILD SAFETY SEAT

The present application is a continuation of PCT/IL2007/001625 filed on Dec. 30, 2007, the priority date of which is claimed herein, and claims priority under 35 USC 119 of Israeli Patent Application Serial No. 180462 filed Dec. 31, 2006, the entire disclosure of each of which is incorporated herein by reference.

TECHNICAL FIELD

The present invention relates in general to a method for implementing a child restraint system wherein a child is disposed during travel in a vehicle and more particularly, to an intelligent child safety seat, or ICSS. The ICSS is coupled in communication with systems operative in the vehicle, and has an electronic unit with a memory loaded with at least ICSS-data. The ICSS-data are the manufacturer's specifications particular to the ICSS.

BACKGROUND ART

The effectiveness of Child Restraint Systems, or CRSs, for the mitigation of hazards associated with crash accidents is well recognized as being dependent on proper use of the CRS. Multiple studies report various accounts of the non-use of a CRS, of misuse thereof, of reuse beyond expiration date or after being involved in a crash, and CRS incorrect installation, as danger-contributing factors. Motorists are found as having only partial knowledge of and conversance with safety instructions and warnings. For example, lack of knowledge regarding use of the LATCH system (Lower Anchors And Tether for Children) introduced in 2002 as the new means for restraining the CRS to a vehicle seat. Lack of knowledge is also reported regarding the age and weight limitations applicable for the appropriate restraint of a child into a CRS.

The background art discloses sensor-based-systems for recognizing the presence of a CRS in the front passenger seat, for detecting the direction of installation of a CRS, as well as for detecting the type of CRS, all being factors needed to prevent indiscriminate deployment of the airbags by the airbag system. The recognition of the presence of a child, in any seating position, is of vital importance to allow various vehicle systems to adjust their operations so as not endanger a child passenger.

Various separate and distinct discrete-issue disclosures have been published but no integrative solution for the CRS related issues have been provided. A few examples out of the many existing patents and patents applications are cited hereinafter. The CRS related art demonstrates the background perceptions wherein CRS related systems and solutions are perceived as a collection of solutions, each for different and separate problems. For example, U.S. Patent applications Nos. 20070222622, 20070057799, 20040164856, 20060273917, 2004113797 and 20060139159, aim to prevent a scenario involving a child being left unattended in a parked vehicle. U.S. Patent application No. 20060273917 recites a car seat with a child car seat belt device that senses when a child is seated inside the vehicle. U.S. Patent application No. 20050278097 recites a child seat monitoring system and method for determining a type of child seat. U.S. Patent application No. 20050278097 does not disclose a child seat having a memory loaded with manufacturer's specification particular to the child seat.

U.S. Pat. No. 5,515,933 and U.S. Patent application No. 20050264061 intend to recognize the presence of a CRS in a vehicle seat. U.S. Patent applications Nos. 20070085394, 20060049677, 20060049929, and 20050280297 deal with the integration of various means into a CRS. U.S. Patent application No. 20070294013 recites a device for a child seat, an ISO-FIX standard lower attachment that is integrated with a data interface and a current supply unit linked to the vehicle interior bus system, for switch-over between comfort and safety mode of the child seat mode to occur depending on at least one of determined danger potentials from predetermined and current vehicle data or ambience data. The elements of the device of the child seat are preferably actuated depending on information suitable to predict an accident, received from a vehicle. U.S. Patent application No. 20070294013 does not recite that the device for the child seat has a memory loaded with the manufacturer's specification particular to the child seat. According to U.S. Patent application No. 20070294013, neither the vehicle nor the child seat are configured to perform operations, or safety applications, which are based on manufacturer's specification particular to the child seat.

U.S. Pat. No. 7,233,239 recites a vehicle mounted user interface that allows the vehicle operator to input the values of belt tension, the type of seat, the weight of the child, and other information into a vehicle mounted child seat detection module. The child seat recited in U.S. Pat. No. 7,233,239 does not disclose a memory loaded with the manufacturer's specifications, Furthermore, the child seat of U.S. Pat. No. 7,233,239 is not equipped with communication properties.

The present disclosure solves problems associated with the function and operations of child safety seats. The first problem is that vehicles are lacking information regarding the manufacturer's specifications of the child safety seat. To solve the problem, the object of the present disclosure is to load, or insert, the manufacturer's specifications into a memory mounted in, or coupled to the child safety seat, which thereby becomes an ICSS. The second problem is the lack of a communication channel which can serve all types of child safety seats. To solve the problem, the object of the present disclosure is to provide the top tether hardware of child safety seats, regardless of the lower type of LATCH system (rigid/flexible (straps)), with communication transmission properties. It is advantageous to utilize the top tether arrangements, since the top tether is a component used and shared by both types of LATCH systems. This solution is applicable for any type of child safety seats, thus also for rear facing infant seats and booster seats which at the present are not equipped with top tether hardware. The third problem is: the identity of the child is not associated with the child safety seat. To solve the problem, the object of the present disclosure is to equip a child safety seat with an I/O module to allow loading of the child identity data into the memory of the child safety seat. Moreover, the object of the present disclosure is to provide an ICSS having an electronic unit including at least a memory loaded with the manufacturer's specifications particular to the ICSS. Alternatively, the ICSS may also have at least a sensors module or a devices module.

In contrast, the embodiments of the present invention are directed to provide a comprehensive solution related to CRS misuse, CRS reuse, CRS recognition, and to provide support data requirements for vehicle systems operative in the vehicle. These results are achieved by the implementation of solutions for providing a communication interface between vehicle and an intelligent child safety seat, or ICSS, which is configured to store at least the manufacturer's specifications particular to the ICSS for recognition by the vehicle.

It is therefore an object of the present invention to equip a conventional CRS so as to become an intelligent child-safety seat, or ICSS, with means to promote intelligent applications. These include means for the verification of appropriate use of the ICSS, and means allowing the vehicle systems to derive the specific vehicle seat into which the ICSS is disposed. These goals are achieved in a cost-effective manner and without being cumbersome to the user, so as to promote implementation of a protective suit for the child passenger.

SUMMARY

It is an object of the present invention to load a memory of an intelligent child safety seat, or ICSS, with at least one item of datum regarding the manufacturer's specifications particular to the ICSS, or ICSS-data, and to configure the ICSS to communicate at least one item of datum of ICSS-data to the vehicle systems of a vehicle. The vehicle systems receive at least ICSS-data and in return are configured to mitigate potential dangers to the child during travel in the vehicle. A user thus receives the ICSS together with the ICSS-data already preloaded therein.

The ICSS comprises a child seat interface coupling the ICSS in at least data communication with the vehicle systems and an electronic unit, which is included in the ICSS and including a memory loaded with at least ICSS-data particular to the ICSS. The electronic unit is configured for communication of at least the ICSS-data of identity-data to the vehicle systems via a joint interface. Thereby, the vehicle systems respond to at least the ICSS-data of identity-data received from the ICSS. The joint communication interface is a single or a bi-directional data link.

It is an object of the present invention to provide an ICSS having an electronic unit including a memory which is configured for storing therein signals and data received from at least one of the ICSS manufacturer, an I/O module, a sensors module, a devices module and the vehicle systems. The electronic unit may receive power by wire from the vehicle via the child seat interface or be integrated with a power supply unit.

It is another object of the present invention to provide an electronic unit that is loaded with identity-data including at least ICSS-data regarding the ICSS and loaded by the manufacturer of the ICSS, where the electronic unit communicates at least the ICSS-data from the ICSS to the vehicle systems. The ICSS-data include the manufacturer's specifications particular to the ICSS, and the ICSS-data include at least one data item selected from the group consisting of seat type, seat orientation, seat installation instructions, seat limitations, seat dimensions, seat manufacturer, seat manufacturer's data, seat model features, and seat restraints. The electronic unit is inherent to the ICSS, either as originally manufactured or as installed in retrofit.

It is still another object of the present invention to facilitate communication between the child seat interface of the ICSS and a vehicle interface of the vehicle as one out of or both, wire communication and wireless communication. And the joint interface is implemented as at least one of a unidirectional data link, a bi-directional data link, or a combination thereof.

It is still another object of the present invention to provide an electronic unit configured for storing signals and data, and where the signals and data include at least ICSS-data out of the identity-data, for identifying the ICSS. The ICSS-data is stored and retrieved from a memory included in the electronic unit. The ICSS-data may also be stored in an identification unit and the vehicle systems read the ICSS-data encoded as current and voltage signals.

It is still another object of the present invention to enable the vehicle systems to perform at least one operation, or safety application, which is based on provided ICSS-data, selected alone and in combination from the group consisting of provision of seat installation instructions to a user,
detection of ICSS incompatibility with the vehicle,
detection of ICSS incompatibility with a vehicle seat VSj,
detection of ICSS incompatibility to a child,
detection of disposition of the ICSS in the specific vehicle seat VSj,
detection of a child's presence in the ICSS,
detection of ICSS being used beyond an expiration date,
detection of a crash-related flag stored in the memory indicating the ICSS being used after being involved in a crash,
detection of a match of the ICSS with a CRS product recall announcement,
detection of an undesired disposition of the ICSS, which is identified as a rear facing infant seat relative to a frontal passenger airbag,
prohibition of the opening from the interior of the vehicle, of the specific door and window adjacent the ICSS 10, and
suppression of the deployment of corresponding airbag.

It is yet still another object of the present invention to provide an ICSS having at least one module selected from the group consisting of an I/O module, a sensors module, and a devices module. The sensors module includes at least one sensor configured for detecting at least one condition associated with the ICSS, and where the at least one detected condition is communicated to the vehicle systems operative in the vehicle.

It is yet another object of the present invention to provide an ICSS having at least one device configured for providing at least one signal in response to a triggering event, and where the at least one signal is provided by a device selected alone and in combination from the group consisting of at least one device included in the ICSS, and a device pertaining to the vehicle systems of the vehicle. The ICSS is possibly configured for independent operation, may be independent from the vehicle systems, and may operate in association with vehicle systems operative in the vehicle.

It is yet one more object of the present invention to provide an ICSS configured for operation in association with vehicle systems operative in the vehicle, and for operation in interaction with at least one user. The ICSS may have an I/O module that allows the user to load and unload data via the I/O module into and out of the memory of the electronic unit; the data include the identity of the child riding in the specific ICSS.

It is yet one more object of the present invention to provide an ICSS where the vehicle systems are operative to respond to at least ICSS-data and one of both or both sensor-data and device-data. The vehicle systems may be configured to store identity-data. Details about the vehicle systems are provided hereinbelow. The vehicle systems are referred to as one entity. The vehicle systems include a plurality of sensors, operable devices, and alert systems.

It is still one more object of the present invention to provide a method for implementation of an intelligent child safety seat, or ICSS, which is coupled to and disposed in a vehicle seat VSj out of the vehicle seats VS, the ICSS providing for a safe disposition therein of a child during travel and for communicating the manufacturer's specifications particular to the ICSS 10, or ICSS-data, to the vehicle. The method comprises the following steps: First, providing a joint interface for coupling the ICSS in at least data communication with vehicle systems, and second, including an electronic unit in the ICSS and loading the electronic unit with identity-data, the ICSS being configured for communication of at least ICSS-data of the identity-data to the vehicle systems via the joint interface.

Thereby, the vehicle systems of the vehicle are operable to respond to at least the ICSS-data received from the ICSS.

It is still one more object of the present invention to provide a method which exploits the conventional process of mechanical coupling of a top tether hardware of a CRS to a vehicle seat for allowing the vehicle systems to derive the specific vehicle seat out of vehicle seats into which the CRS is coupled, and possibly communicate the ICSS identity-data to vehicle systems. The operation by a user of a joint interface is configured for simultaneously coupling a mechanical interface and communication interface. For example, when the child seat interface is operatively coupled to a vehicle interface, and when a) the vehicle interface is configured as a vehicle communication interface embedded in a top tether anchorage of a vehicle mechanical interface, and b) the child seat interface is configured as a child seat communication interface embedded in a top tether hardware of a child seat mechanical interface, then communication between the ICSS and the vehicle systems is achieved by at least one coupling operation of top tether arrangements.

In the last example, in at least one coupling operation, the user accomplishes mechanical, electronic, and communication coupling between the ICSS and the vehicle seat, thus another dedicated system is not required to determine and recognize the presence of the ICSS in the vehicle seat.

It is still one more object of the present invention to provide a method for providing mechanical, electronic, and communication coupling embedded in a top tether arrangement of an Intelligent Child Safety Seat, or ICSS, and a passenger seat VSj of a vehicle having vehicle systems. The method comprising the steps of:

providing the ICSS with a child safety interface which is formed by a child seat communication interface embedded in top tether hardware of a child seat mechanical interface, providing the passenger seat with a vehicle interface, which is formed by a vehicle communication interface embedded in a top tether anchorage of a vehicle mechanical interface, and coupling the child seat interface to the vehicle interface, whereby the vehicle systems recognize the vehicle interface and derive to which specific vehicle seat the ICSS is coupled, and whereby communication is facilitated between the vehicle systems and the ICSS. Any type of CRS, can be implemented as an ICSS, such CRS may be rear-facing restraints (infant-only and convertible), forward-facing restraints (convertible, child seat, combination seat), car beds, harnesses, and boosters of any type, and built-in seat of the vehicle seat (VS). Even rear-facing restraints and booster seats, that in prior art designs are not shown equipped with "top tether", are provided with a child seat interface having communication properties.

It is thus an object of the present invention to teach, for example, straightforward transformation of a conventional CRS into an ICSS. The ICSS includes: a memory loaded with identification ICSS-data, at least one sensor out of a sensors module dedicated to sample the state of occupancy of the ICSS, and a joint interface providing at least communication coupling between the ICSS and the vehicle. The joint interface is possibly embedded in the top tether arrangements of both the ICSS and of a vehicle seat. Thus, coupling the top tether arrangements will establish the desired communication between the electronic unit and the vehicle systems. This coupling establishes a data communication link, which may be transparent to the user. Such an embodiment is configured with or without the integration into the ICSS of a built-in power supply, of a processor, of an I/O module, of a devices module, or of a link to external systems.

BRIEF DESCRIPTION OF DRAWINGS

To understand the invention and to see how it may be carried out in practice, preferred embodiments will now be described, by way of non-limiting example only, with reference to the accompanying drawings, in which.

DETAILED DESCRIPTION OF THE INVENTION

Figure 1A:
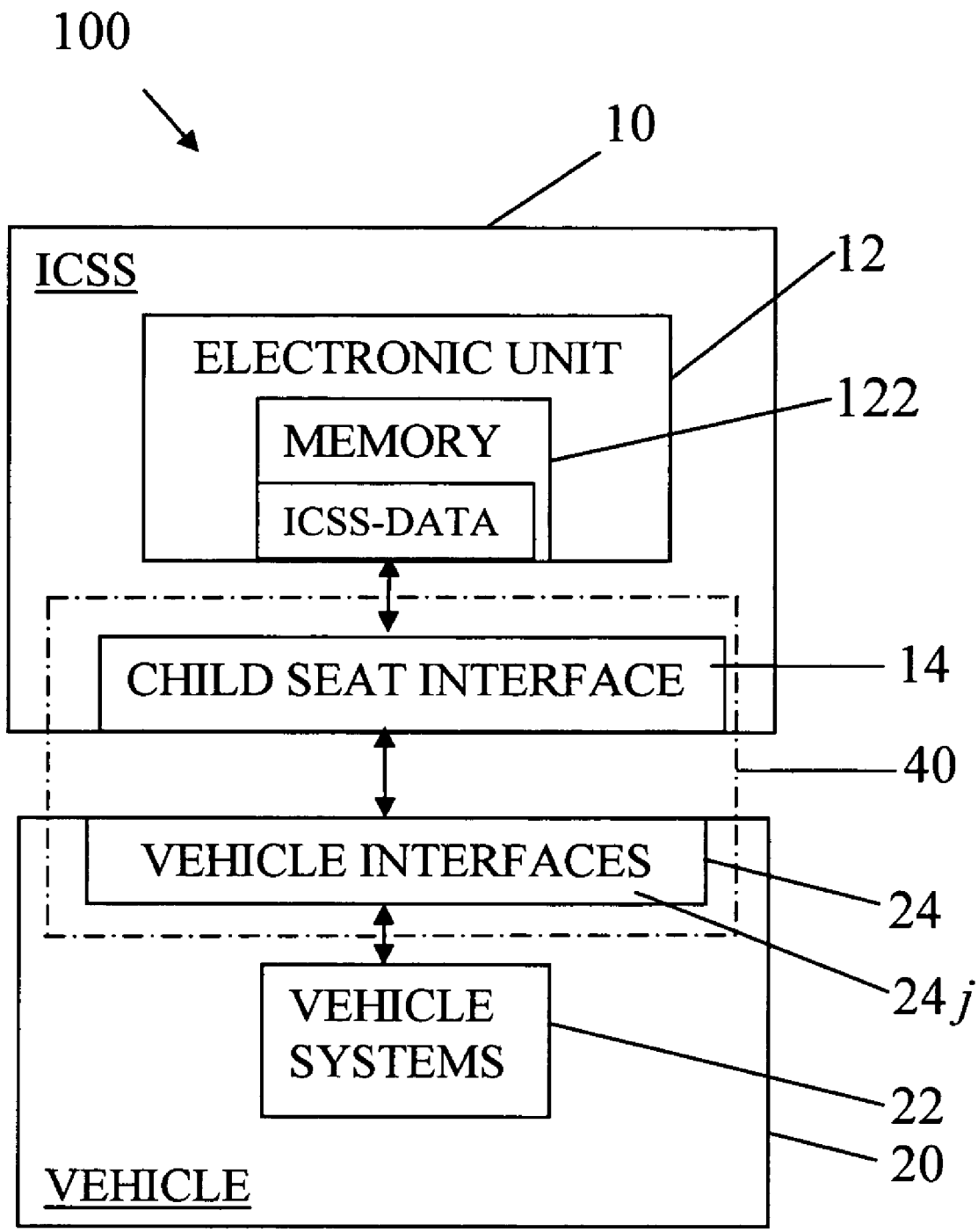
FIG. 1A shows a diagram of an embodiment 100 showing an intelligent child safety seat, or ICSS, having an electronic unit including a memory loaded with ICSS-data, and a child seat interface for communication with the vehicle.
Figure 1B:
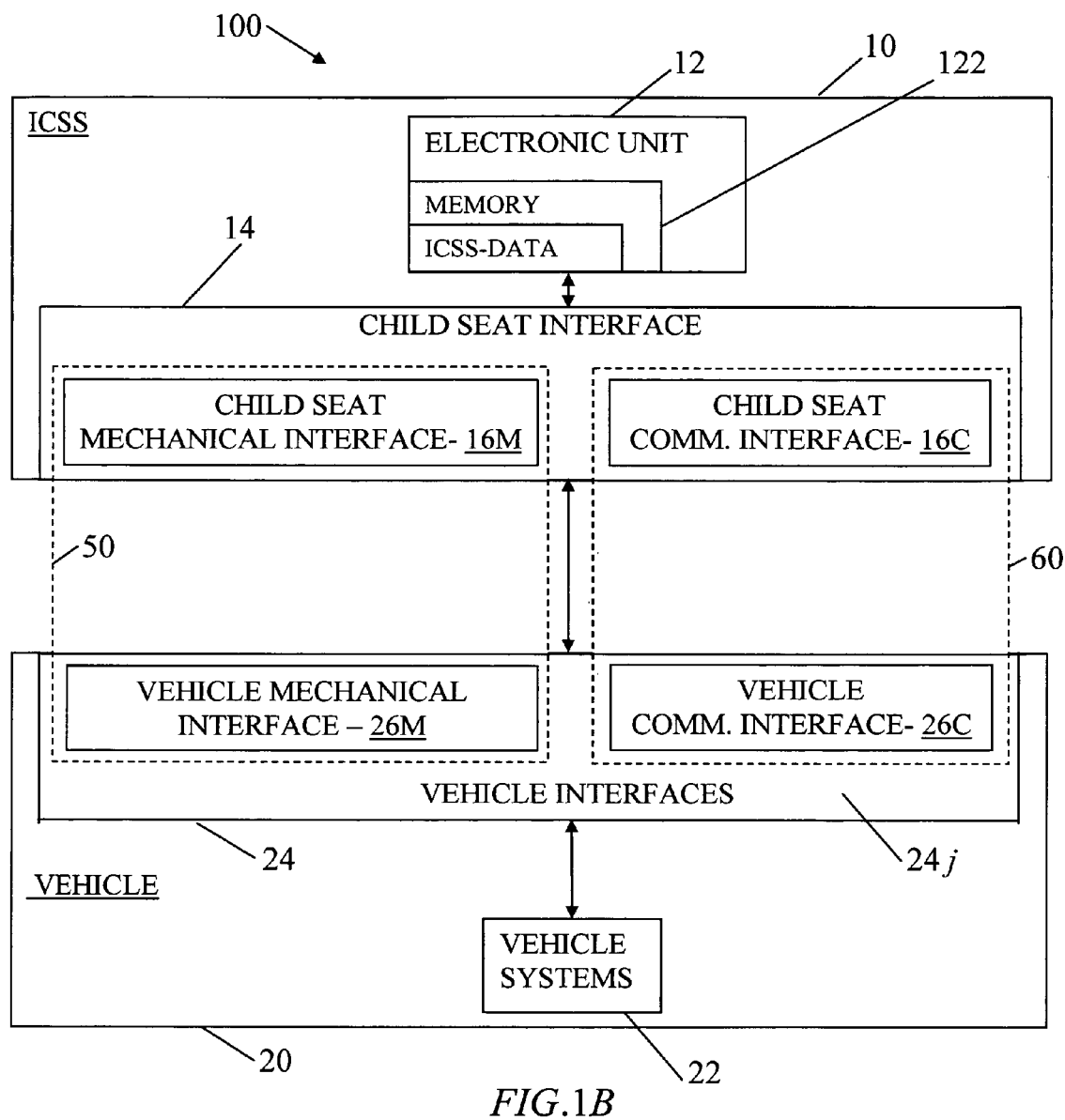
FIG. 1B shows a more detailed diagram of the embodiment 100.
Figure 2:
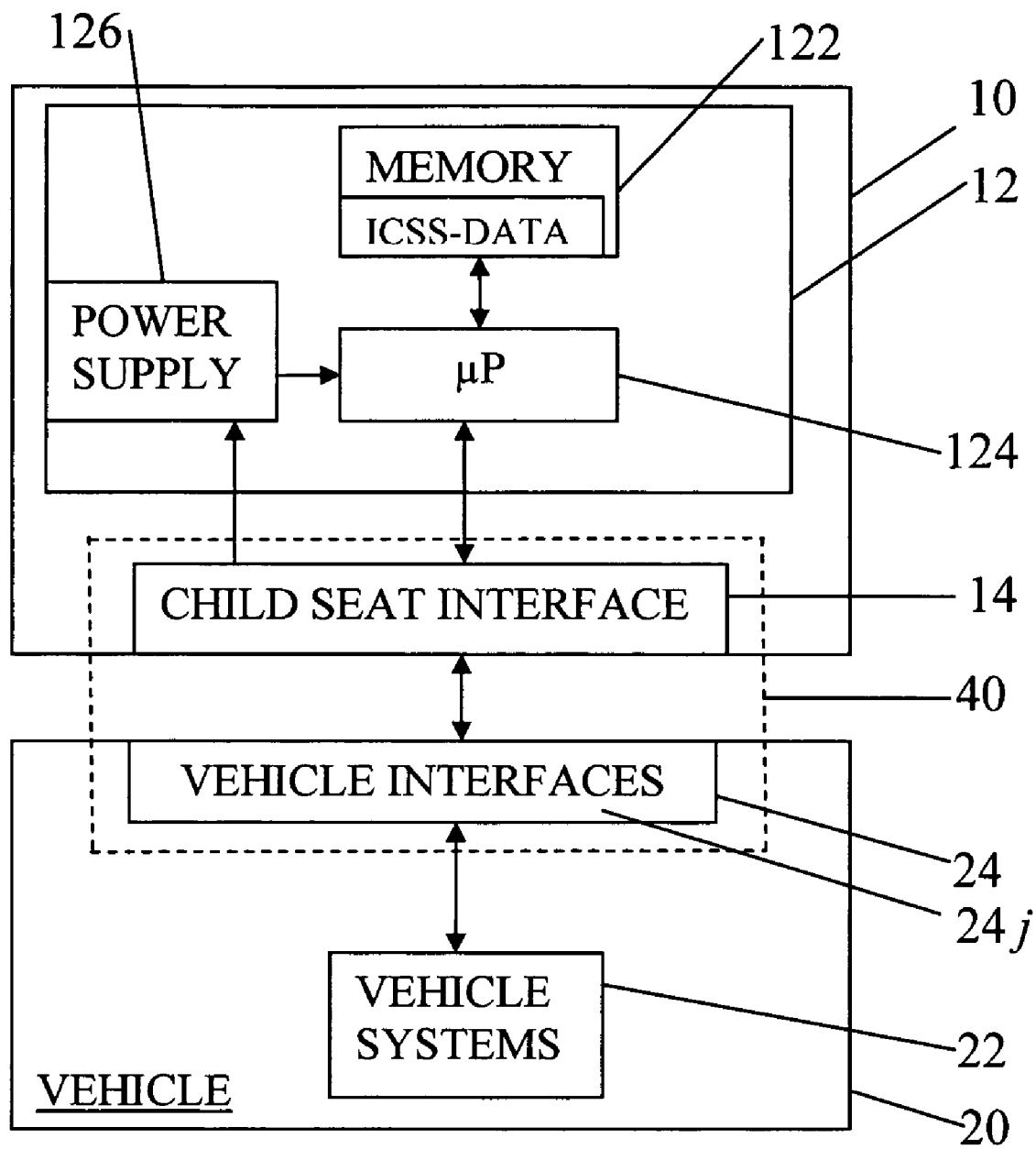
FIG. 2 is a schematic illustration presenting further details of the electronic unit including a memory loaded with ICSS-data.
Figure 3:
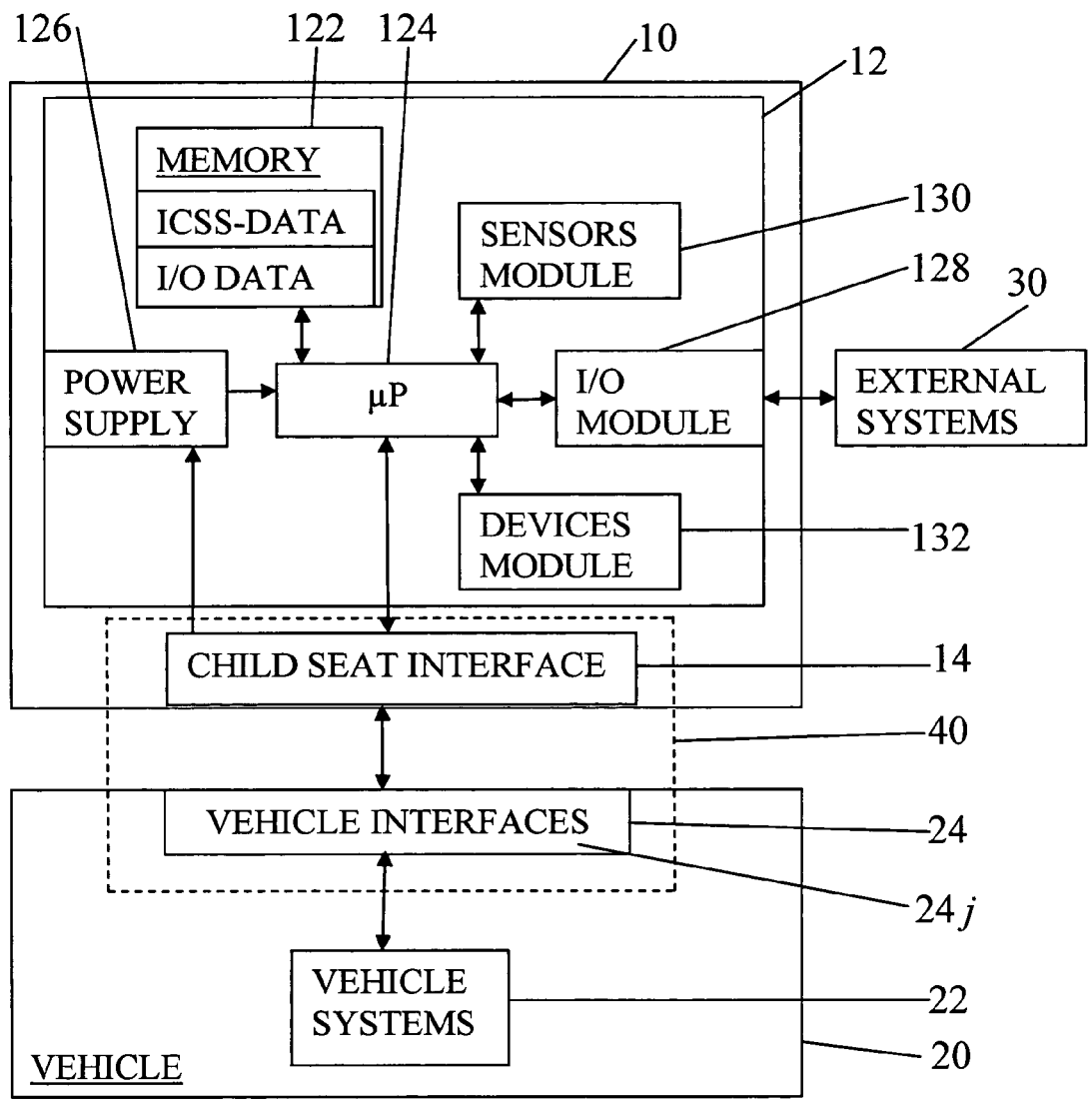
FIG. 3 depicts an enhanced embodiment of the electronic unit including a memory loaded with at least ICSS-data.

FIG. 1A and FIG. 1B are schematic illustrations of an embodiment 100 showing an intelligent child safety seat 10, or ICSS 10, and a vehicle 20. The ICSS 10 has an electronic unit 12 including a memory 122 loaded with ICSS-data, and a child seat interface 14. In parallel, the vehicle 20 has vehicle systems 22 and a vehicle interface 24. FIGS. 2 and 3, provide a more detailed description of the electronic unit 12, the memory 12 and ICSS-data, while the description for FIGS. 1A and 1B elaborate about establishing communication between the ICSS 10 and the vehicle 20. Both the child seat interface 14 and the vehicle interfaces 24 form a joint interface 40 that provides mechanical, electronic, and communication coupling between the electronic unit 12 of the ICSS 10 and the vehicle systems 22 operative in the vehicle 20. The term vehicle 20 applies to all means of transportation of passengers.

The joint interface 40, framed by a dash-and-dot line in FIG. 1A, refers jointly to both the child seat interface 14 and the vehicle interfaces 24, which are disposed in the ICSS 10 and in the vehicle 20 respectively. Communication between the child seat interface 14 and the vehicle interfaces 24 may be either wired or wireless. The joint communication interface 60 included in the joint interface 40 may be implemented as a wireless communication interface, or as a wired communication interface, or as an interface having a combination of both wireless and wired communication.

The ICSS 10 may also be configured for independent operation, thus without the support of the vehicle systems. In other words, the ICSS may be configured for operation dependently from, thus in association with systems operative in the vehicle, and also independently from the systems operative in the vehicle. The joint interface 40 may include a unidirectional data link, a bi-directional data link, or a combination thereof, but is referred to hereinbelow as a wired plug-in system for the ease of description only.

The child seat interface 14 and the vehicle interface 24 may be integrated or embedded as desired. For example, the child seat interface 14 may possibly be integrated into, or associated with the operation of the child-seat mechanical interface 16M. Likewise, the vehicle interfaces 24 may possibly be integrated into, or associated with the operation of the vehicle mechanical interfaces 26M.

One purpose of the joint interface 40 includes the exchange of data between the ICSS 10 and the vehicle 20, or at least, the emission of data, referred to as identity-data, from the ICSS 10 to the vehicle systems 22. The term identity-data applies to all data items originating from the electronic unit 12 of the ICSS 10 that are communicated to the vehicle systems 22, and to the data items received by the electronic unit 12 from the vehicle systems 22. As described hereinbelow, the identity-data includes at least ICSS-data, but may also include ICSS-data together with data selected alone and in combination from the group consisting of sensor-data and device-data Child Restraint Systems 70, or CRS 70, which are not shown in the Figs., are well known in the art of transporting children of different age. To avoid confusion of terms, the term CRS also applies to "car seat", "child seat", "child safety seat", "child restraint or CR", and the like. Child restraint systems 70, in service for conventionally available child-seats as well as employed by the ICSS 10, include for example rear-facing restraints (infant-only and convertible), forward-facing restraints (convertible, child seat, combination seat), car beds, harnesses, and boosters (belt-positioning and shield).

Reference is now made to the vehicle interfaces 24.

A plurality of vehicle interfaces 24, say one vehicle interface 24 per vehicle seat VS helps, amongst others, to determine to which specific one of the seats of the vehicle 20 the ICSS 10 is coupled.

Each vehicle seat VS, not shown in the Figs., is identified as a specific vehicle seat VSj, wherein j=1, 2, 3, . . . , n2, and n2 is a finite integer. Each vehicle interface 24 is identified as 24j, wherein j=1, 2, 3, . . . , n2 and be associated with a specific vehicle seat VSj. The vehicle systems 22 are thereby able to identify exactly into which specific vehicle seat VSj out of the vehicle seats (VS) the ICSS 10 is disposed when the joint interface (40) is coupled, thus not only front seats or rear seats in general, but to which discrete seat exactly in the front or in any rear row of vehicle seats. The vehicle systems 22, operating via the joint interface 40 thus derive at least into which specific vehicle seat VSj an ICSS is disposed.

When vehicle interfaces 24 are not implemented in the joint mechanical interface 50, then they may be associated with any part or portion of vehicle seat VSj, or be disposed in close proximity to vehicle seat VSj. Such an Intelligent Buckle is described in detail in Israel Patent Application No. 181390, by Asher Saban, which is incorporated herein in whole by reference, reciting a vehicle interface 24j embedded in the buckle of the vehicle's seat belt.

According to U.S. Patent Application No. 20090027188, which is incorporated herewith in whole by reference, a vehicle 20 is fitted with various vehicle systems 22, possibly controlled by a processor and including a plurality of sensors, operable devices, and alert systems.

The sensors of the vehicle systems 22, which are not shown in the Figs., may include, for example, sensors configured for the detection of events including seat belts buckling status, ignition switch status and ignition key presence, load on seats, engine RPM, gearbox shift position, parking brake status, windows and door-locks position, and smoke detecting sensor. These sensors are continuously or intermittently sampled under command of the vehicle systems.

The operable devices of the vehicle systems 22, which are not shown in the Figs., may include many different items, including amongst others: engine ignition switch, ignition key switch retention mechanism, shift-interlock such as brake-to-shift or transmission shift, key-free system, gearbox functioning, seat restraints systems like the seat belt system and the airbag system, power windows and door lock modules, devices for releasing the trunk-lid from inside trunk compartment, central doors-locking devices, power accessories like electrically operated roof-panels, climate control devices, communication systems to establish communication with communication networks, the notification system, the automatic collision notification system, internet communication systems, information systems like the driver message center, navigation systems, driving assisting systems like parking imaging and observation system, parking aid systems, lane departure and lane change systems, driver condition warning systems like for detecting driver intoxication and driver drowsiness, entertainment devices, information devices like belt reminder systems, occupant classification sensing devices, occupant detection devices, event data recording devices, audio systems, cigarette lighters, internal and external lights, the horn, the burglar alarm, the vehicle immobilizer system, the clock, and the timer.

The alert systems of the vehicle systems 22, which are not shown in the Figs., may include, for example, visual or audible signals, dedicated vehicle warning lights, the interior lights of the vehicle, audible alerts, vocally recorded messages, screen readable messages, screen displayed images, warning labels and messages, operation of the audio system, and prevention of removal of the ignition key. Signals may also include the horn, the exterior lights, the vehicle's burglar alarm siren, and signals received by remote communication systems. Other signals, even though not perceptible by sight or sound, include disabling of the vehicle's door locking mechanism and operation of some elements out of the communication unit, such as for emitting signals to one or more remote stations. Other alert signals such as tactile signals and vibration emitting signals may also be practical.

Reference is now made to FIGS. 1B, 2, 3, and 4, and to the child seat interface 14.

In FIG. 1B, the child seat interface 14 is shown to actually include a child seat mechanical interface 16M and a child seat communication interface 16C. Likewise, each one of the vehicle interfaces 24 includes a vehicle mechanical interface 26M and vehicle communication interface 26C. In the same manner, the communication interfaces 16C and 26C are configured to allow the exchange of data, including electronic signals. In practice, the structure of the mechanical interfaces 16M and 26M coupling between the ICSS 10 and the vehicle 20 may include the communication interfaces, respectively 16C and 26C. Actually, the child seat communication interface 16C of the child seat interface 14 pertaining to the joint interface 40 is included in the ICSS.

The child seat mechanical interface 16M and the vehicle mechanical interfaces 26M may be implemented as desired and form the joint mechanical interface 50, shown in FIG. 1B. The term interface relates to both the plural and the singular. In parallel, the child seat communication interface 16C and the vehicle communication interfaces 26C are referred to as the joint communication interface 60. The joint interface 40 may thus include a joint communication interface 60 and a joint mechanical interface 50 which are configured for operation in mutual association. Therefore, the joint interface 40 may include an interface consisting of at least a joint communication interface 60, or a joint communication interface 60, that is included in the joint mechanical interface 50, or a joint communication interface 60 together with a joint mechanical interface 50, which operate in association.

It is thus possible to refer to a joint mechanical interface 50, which includes for example both the anchorage of the vehicle mechanical interfaces 26M and the child seat mechanical interfaces 16M of the CRS 70 or of the ICSS 10, allowing a user to couple the ICSS 10 to the vehicle 20. The embodiments of the present invention include and feature a method and means for the utilization of the joint mechanical interface 50 to connect between the child seat interface 14 and the vehicle interfaces 24, which last two form the joint interface 40. The joint mechanical interface 50 may be implemented into conventional mechanical coupling means that are integrated in the vehicle 20 and in a CRS 70, or ICSS 10.

The vehicle mechanical interfaces 26M which are the mechanical portion of the vehicle interfaces 24 of the vehicle 20, may include at least one of the mechanical means pertaining to a vehicle seat VS (not shown in Figs.). A vehicle seat VS may include a set of lower anchorage-designated bars or brackets that are affixed to the body of the vehicle 20, and a top tether anchorage or even a seat belt. The vehicle communication interface 26C includes wired communication means in the present example, for the ease of description.

The child seat mechanical interface 16M, which is the mechanical portion of the child seat interface 14, may include at least one of the mechanical means pertaining to a CRS 70 (not shown in Figs.). The mechanical means of a CRS 70 may include lower attachment assemblies, such as ISOFIX lower rigid attachments, or LATCH lower flexible attachments, and the top tether hardware at the end of the LATCH attachment, such as a top tether hook, push-button connector or latching device compatible with lower anchorages and top tether anchorage of the vehicle mechanical interfaces 26M.

The child seat communication interface 16C refers to wired communication means in the present example, for the ease of description.

Therefore, coupling the ICSS 10 to the vehicle 20, to couple the vehicle interfaces 24 to the child seat interface 14, actually means to create both a joint mechanical interface 50 connection and a joint communication interface 60 connection, which are coupled by the user in one, or more, operation(s).

The joint interface 40 allows the vehicle systems 22 to recognize the presence of the ICSS 10 in a specific vehicle seat VSj, and to establish a joint communication interface 60 between the vehicle systems 22 and the electronic unit 12. The joint interface 40 may be implemented as a unidirectional data link and as a bi-directional data link, according to desire. Moreover, the ICSS 10 may be implemented with an electronic unit 12 that is included in the ICSS at the time of original manufacture, or at a later time, when installed in retrofit.

The joint interface 40 is especially important with regard to the safety bags control system included in the vehicle systems 22. For example, after the coupling of the ICSS 10 to the vehicle 20, the joint interface 40 automatically communicates signals permitting automatic recognition of the presence of the ICSS 10 in the vehicle seat VSj, and allowing the respective control of the safety bags associated with the seat VSj.

The joint interface 40 is implemented as desired, is not limited to LATCH or other existing hardware, and may be adjusted to fit any type of CRS 70 or coupling means including the modifications of booster seats. The implementation of the joint interface 40 is not limited to obvious technical and mechanical configurations, like any specific type of latching devices that are integrated, or may be integrated, with wire connection features, the coloring of the interface means, the coating of the interface means with glowing materials to ease coupling in the dark, as well as storage and storage cover means, wire retraction mechanisms, and the integration of lighting means and lighting indicators.

Even when the child seat interface 14 is not included in a CRS 70, the vehicle systems 22 are still in a position to at least determine the presence of a CRS 70 in a vehicle seat VSj via the vehicle interfaces 24. In a degraded embodiment of the joint interface 40, the vehicle communication interfaces 26C, may be configured to solely detect the mechanical connection of a child seat mechanical interface 16M, of the CRS 70, by help of any type of, say, contact sensor(s), when such a CRS 70 is coupled to a vehicle interface 24.

One may consider a simple example of the embodiments of the invention where the joint interface 40 is embedded in the top tether arrangements: the child seat communication interface 16C is embedded in the top tether hardware of the child seat mechanical interface 16M to become the child seat interface 14. Likewise, the vehicle communication interface 26C is embedded in the top tether anchorage of the vehicle mechanical interface 26M to become the vehicle seat interfaces 24. The term top tether arrangements applies to the top tether anchorage integrated within the vehicle 20 and the top tether hardware/latching device integrated in the CRS 70, or ICSS 10.

In this exemplary case, it is advantageous to utilize the top tether arrangements, since the top tether is a component used and shared by both types of LATCH systems. The LATCH systems may include lower attachments that are either rigid or flexible. By providing the top tether arrangements with communication transmission properties, the joint communication interface 60 may be created. In this case, when a user couples the top tether arrangements in at least one coupling operation, both the joint mechanical interface 50 and the joint communication interface 60 are connected to become operative.

However, the joint communication interface 60 may also be integrated within the lower attachments. Likewise, the joint communication interface 60 may optionally be embedded in more than one component of the joint mechanical interface 50.

In general, a vehicle 20 is fitted with various vehicle systems 22 including equipment elements having a plurality of sensors, of operable devices, of alert systems, and of systems that may be used for giving alert. The vehicle systems 22 include equipment that is originally inherent to the vehicle as installed by the manufacturer of the vehicle when delivered to the client, and equipment installed and added to the vehicle in retrofit. Vehicle systems 22 are able to execute commands in response to identity-data delivered by the electronic unit 12, as explained hereinbelow.

One of the vehicle systems 22 is for example a system dedicated to provide a protective suite to the child, as described in detail in U.S. Patent Application No. 20090027188, which is incorporated herewith in whole by reference.

The intelligent child safety seat 10, or ICSS 10 may also provide audible, visual, and broadcasted warning signals via the devices module 132 shown in FIG. 3, and operate independently or in association with the vehicle system 22 of the vehicle 20 in response to identity-data received from the electronic unit 12 or from the vehicle systems 22. This means that a warning is provided to a user when a potential danger is detected, which warning may be provided by means including the ICSS, or the vehicle systems, or both the ICSS and the vehicle systems. The identity-data may be received from the vehicle systems 22 and includes at least ICSS-data stored in the vehicle 20.

FIG. 2 is similar to FIG. 1A but is a more detailed block diagram showing that the electronic unit 12 includes elements such as a memory 122, a processor 124, and a power supply 126.

The memory 122, which may be implemented as any known type of memory, may be configured to store any type of data and be integrated anywhere in the ICSS 10, including in the child seat interface 14. The memory 122 may be coupled in bi-directional communication to the processor 124. Both the memory 122 and the processor 124 may be selected as desired. However, a degraded version of the ICSS 10 may possibly avoid the use of memory 122 but instead have a CRS identification unit, not shown in the figs, that is installed into and is operative in association with the vehicle systems 22. In fact, the CRS identification unit serves as a degraded version of the memory 122, while both the memory 122 and the CRS identification unit function as storage devices. For example, the vehicle systems 22 may read data encoded as current and voltage signals received from the CRS identification unit of the ICSS 10. Practically, the vehicle systems 22 may read a single item of datum out of the ICSS-data which may be encoded either as a current signal or as a voltage signal.

The processor 124 manages and controls the operation of the electronic unit 12 and may be coupled in bi-directional communication to the child seat interface 14. A degraded version of the ICSS 10 may possibly be configured to avoid the use of a processor 124 in the same manner as the use of a memory 122 is avoided, according to the description hereinabove.

A power supply 126 is preferably coupled to all the elements of the electronic unit 12, including the processor 124 and the memory 122. The power supply 126 may be implemented as a battery, preferably as a rechargeable battery that is coupled to the child seat interface 14. Alternatively, the electronic unit 12 and the power supply 126 may receive power by wire from the vehicle 20 via the child seat interface 14. If the battery of the vehicle 20 supplies the necessary power, then care is taken not to discharge the vehicle's battery. Furthermore, electric power is not disconnected immediately at switch-off of the ignition of the vehicle 20, but according to predetermined conditions and safety rules. A safety rule may command powering of the electrical circuits of the ICSS 10 as long as the ICSS 10 is reported as being occupied by a child.

One may now consider a simple example where the memory 122 is loaded with the manufacturer's specifications particular to the ICSS 10, referred to as ICSS-data, of the ICSS 10 that is in actual use. The ICSS 10 transfers those particular specifications, thus the ICSS-data, to the vehicle systems 22, via the joint interface 40. Therefore, when a particular type of ICSS 10 is coupled to the vehicle 20, the ICSS-data are transmitted to the vehicle systems 22. Next, the control module described in the herewith-incorporated U.S. Patent Application No. 20090027188, samples the received ICSS-data, and if for example, it is detected that the ICSS 10 is of a type incompatible with the anchoring available in the vehicle 20, a warning signal is provided by the vehicle systems 22. Evidently, appropriate vehicle systems 22 are necessary to provide a warning signal, for example like those referred to in the herewith-incorporated U.S. Patent Application No. 20090027188. The word "load" implies inserting into, i.e. inserting ICSS-data into the electronic unit 12 of the ICSS 10 so that either the vehicle systems 22 or the ICSS 10 will operate thereon, and the term "ICSS-data" applies to any information regarding the manufacturer's specifications particular to the ICSS 10 that is loaded into the ICSS 10.

The ICSS-data include i different memory items 122*i*, where i=1, 2, 3 . . . , n1, and n1 is a finite integer. There may thus be only one particular item of memory datum when i=1, and so on. As described hereinabove, when an identification unit is used to encode an item of datum of ICSS-data and no memory 122 is available, or no item of datum is stored in the memory 122, then i=0. In any case, the electronic unit 12 has to store at least one item of datum of ICSS-data in either the memory 122 or the identification unit to become an ICSS 10. As an example only, some of the data items that may be included in the ICSS-data are listed hereinbelow.

1. Seat type: identifies the nature of the ICSS 10 according to known and available classification listings, such as originating from industry, or from a regulatory agency, or from certification laboratories. An exemplary classification may include and designate the following types: infant seat, convertible seat, child safety seat, combination seat, booster seat, booster cushion, and integrated or built-in seat.

2. Seat orientation: identifies the ICSS 10 as rear-facing, or as front-facing, or optionally as configured for installation facing both rear and front of the vehicle.

3. Seat Installation Instructions: stores the ICSS 10 user guide installation instructions, as audible and/or visual information. For example, the ICSS 10 user guide is organized and stored as ICSS-data which is configured to disclose information regarding installation instructions, warnings, and so forth.

4. Seat limitations: defines limit values, such as child age range, weight range, and height range of the child to be seated in the ICSS 10. Information may also be presented in accordance with known CRS related mass groups, such as 0, 0+, 1, 2 and 3 defined by regulation authorities.

5. Seat dimensions: defines any set of physical dimensions of the ICSS 10. For example, seat dimensions may include the geometry of the ICSS 10 when empty, and/or the envelope of the ICSS 10 when occupied. The envelope may include the regulatory limits set for a child's head excursion as permitted for the specific CRS in crash conditions. Seat dimensions may be organized into specific envelope size categories. In that case, the vehicle systems 22 receive the envelope size category of the ICSS 10 and are configured to retrieve the physical dimensions of the ICSS 10 size of envelope from a safety data memory included in the vehicle 20.

6. Seat manufacturer: identifies the manufacturer of the ICSS 10, to enable a compatibility check with the list of manufacturers of CRSs approved by a regulatory agency or by the vehicle manufacturer.

7. Seat manufacturer's data: identifies the ICSS 10 by model number (i.e. ID number, manufacturer part number (MPN)), model name, date of manufacture, expiration date, seat net weight and further desired data. Such data allows the checking of compatibility with a specific vehicle 20, or with a specific vehicle seat VSj in the vehicle 20, or identification in case of product recall.

8. Seat model features include for example: harness type, overhead shield, T-shield, headrest, hand rest, high back, CRS having a base and carrier units.

9. Seat restraints: defines the means for restraining the CRS, for example the LATCH, having flexible attachments or ISOFIX with rigid attachments, and the use of the seat belts of the vehicle VS. For example, the seat restraints identify the ISOFIX size class for the specific ICSS 10 from a list of, say, 7 known market ISOFIX size classes (A, B, B1, C, D, E, F, and G). The seat restraints include information regarding an ICSS and ISOFIX ICSS, specific category, for example known market categories include: Universal, Semi-universal, Vehicle specific, and Restricted. Seat restraints information allows the checking of compatibility of an ICSS 10 to a specific vehicle 20, or to a specific vehicle seat (VSj). As described hereinabove, a list of suitable vehicle makes and models is provided to identify the model of the vehicle 20 where the ICSS 10 is suitable for use. Such a list is in particularly needed if the selected category for the ICSS 10 is vehicle specific or vehicle restricted.

As described hereinbelow, the identity-data in memory 122 may include only ICSS-data and also identity-data together with sensor-data and device-data. According to the embodiments of the present invention, the manufacturer of the ICSS 10 loads the ICSS-data either in the memory 122 and/or in the identification unit. A user thus receives the ICSS together with the ICSS-data already preloaded therein.

The vehicle systems 22 may thus take advantage of the received identity-data to mitigate potential dangers to the child disposed in the ICSS 10, by taking appropriate action such as: preventing airbag inflation towards a vehicle seat VSj occupied by a child-carrying ICSS 10, allowing airbag inflation based on seat dimensions, or delivering an adequate warning signal when necessary, such as horn and lights actuation emitted in response to a triggering event. A triggering event, indicating the detection of an identified potential or imminent danger, may be initiated by the ICSS 10 or by the vehicle systems 22.

The ICSS 10 may be configured to assist a user desiring to install the ICSS 10 in a vehicle seat VS by providing real time installation instructions which are stored in a memory (122) and are presented to a user as instructions selected alone and in combination, from the group consisting of visually presented and vocally sounded installation instructions. For that purpose the memory 122 is loaded a priori with Seat Installation Instructions, possibly interactive, which are delivered acoustically and/or visually. Such instructions may be stored as text messages, mpeg/video clips or as vocal data. These instructions may be viewed on any display pertaining to the vehicle systems 22 and/or to the devices module 132 shown in FIG. 3. The retrieval of the interactive installation instructions and the real time monitoring of the installation of the ICSS 10, reduce the possibility of misuse, including wrong installation of the ICSS 10.

The prevention of ICSS 10 misuse, for any of different reasons, is achieved by the vehicle systems 22 that process the identity-data, which are stored in memory 122, and provide warning(s) to alert the user about detected incompatibilities. For example, the user is warned against the disposition of the ICSS 10 in relation to air bags, against age and weight non-appropriateness of the ICSS 10 with respect to the child-user, and deliver reminder alert(s) regarding the recommended direction of installation of the ICSS 10.

The ICSS 10 is configured to alert the user against reuse of an ICSS 10 present in a vehicle 20 that was previously involved in an accident, by saving accident-related data in the memory 122. Accident data, or crash data, are communicated from the vehicle systems 22 for registration in the memory 122, for example as a flag. The vehicle systems 22 of a vehicle 20 may include an automatic check procedure for the detection of a crash-related flag stored in the memory 122. Alternatively, the vehicle systems 22 store identity-data and check, for example, crash involvement by monitoring the ICSS flag. One more example regarding vehicle systems that store identity-data, thus at least one ICSS-datum, permits the manufacturer of the ICSS 10 to load at least one item of datum, say, the seat model and the seat manufacturer's data, and transfers the rest of the ICSS-data defining the ICSS 10 for storage in a safety data memory of the vehicle 20. The vehicle systems 22 are then able to retrieve ICSS-data defining the specific ICSS 10, through association of the received seat model of the ICSS 10 with stored sets of ICSS-data of ICSSs 10 approved for use in the vehicle 20. As mentioned hereinabove, an ICSS 10 is configured to disclose at least one item of datum of ICSS-data to enable implementation of such application. The vehicle systems 22 are configured to emit a safety warning to the user if the seat model is not recognized by the vehicle systems 22.

The ICSS 10 is also configured to assist the user to track the expiration date of the ICSS 10, to avoid use thereof beyond the manufacturer's expiration date. The vehicle systems 22 may monitor the ICSS 10 expiration date, provide an alert when the date expires, and may also receive a notice from the vehicle 20 maker or from the ICSS 10 manufacturer through a notification system pertaining to vehicle systems 22, identifying the specific ICSS 10 model as not being recommended for further use. However, it is possible for the expiration date to be amended according to more recent instructions delivered through a notification system.

It is thus possible to conduct a check on the identity-data and on the ICSS, and to provide warning to a user when the check detects an event selected for example, alone and in combination from the group consisting of a prior crash involvement, an expired ICSS expiration date, an ICSS recall announcement, a faulty ICSS installation, an ICSS to vehicle incompatibility, an ICSS to vehicle seat incompatibility, and an ICSS to child incompatibility.

Another example of incompatibility to be detected between an ICSS 10 and a vehicle 20 is detection of a mismatch between the weight range of the ICSS 10 having a LATCH system and the weight limit of LATCH set by the manufacturer of the vehicle. Put differently, if the weight range of an ICSS 10, or CRS 70, is, say, 80 pounds and the weight limit of the vehicle LATCH is, say, 40-48 pounds then a safety warning instruction is emitted to the user by the alert systems of the vehicle systems 22. Such a warning will direct the user to restrain the ICSS 10 with the seatbelt of the vehicle seat (VSj), or with the seatbelt of the vehicle seat (VSj) together with the LATCH system of the ICSS 10. This safety application is facilitated by the disclosed seat limitations of the communicated ICSS-data.

The fact that a child-occupied ICSS 10 is disposed and coupled to a vehicle seat VSj is important relevant knowledge for the vehicle systems 22. As described in the incorporated U.S. Patent Application No. 20090027188, danger avoiding, and danger mitigating measures are possibly taken by the vehicle systems 22 before, during, and after a ride, and even when the vehicle is parked.

The detection of a child's presence in the ICSS 10 is facilitated in more than one way. One option, described hereinbelow, utilizes a sensor pertaining to the sensors module 130. Another option to determine whether the ICSS 10 is occupied by a child includes detection by vehicle systems 22. When the ICSS 10 is detected as being coupled to the vehicle seat (VSj) and the load weight on the vehicle seat (VSj) is detected as being higher than the net weight of the ICSS 10 (seat net weight disclosed by the seat manufacturer's data) then the ICSS 10 is determined to be occupied. Conventionally, an occupant classification sensing system pertaining to the vehicle systems 22 is configured to measure weight load on a vehicle seat (VS).

When a child-occupied ICSS 10 is detected in a front-row passenger seat of the vehicle 20, and particularly so for a rear-facing ICSS 10, then the vehicle systems 22 have to suppress the deployment of the corresponding airbag.

Alternatively, radio frequency identification, or IDRF, included in the ICSS 10 may be implemented for communication between the vehicle 20 and the ICSS 10. In that case, plug-in hard wire communication is not needed and the mere introduction, or activation of the ICSS 10 by introduction into the vehicle 20 is sufficient to establish mutual communication.

In another example, when an ICSS 10 is detected as being coupled to the vehicle interface 24j of a vehicle seat VSj adjacent a door-window, then, the vehicle systems 22 prohibit, for example, the opening from the interior of the vehicle 20, of the specific door and window adjacent the ICSS 10.

The occupancy of the ICSS 10 in a vehicle seat VSj may be detected either by the vehicle systems 22 or by a sensor disposed in the ICSS 10 as described hereinbelow with reference to FIG. 3. For example, an appropriate sensor disposed in the vehicle 20, such as an IR sensor, or a load sensor integrated in the vehicle seat VSi of the vehicle 20, may provide such an occupancy indication. Otherwise, a suitable sensor included in the ICSS 10 may perform the task.

FIG. 3 illustrates an even more detailed block diagram of the electronic unit 12, showing additional elements such as an input-output module 128, or I/O module 128, which is coupled in bi-directional communication to the processor 124 and to external systems 30. The I/O module 128 allows loading and unloading of data into and out of the memory 122 via the processor 124. For example, a manufacturer may use external systems 30 to load the memory 122 with appropriate identity-data. Furthermore, the I/O module 128 permits bi-directional communication of data, via the processor 124, between the memory 122 and external systems 30, by means of suitably selected communication channels. Moreover, the ICSS 10 is thus configured for interaction with at least one user, including interaction via the I/O module 128. Interaction with the ICSS 10 is possible either when the ICSS 10 is dependent upon the vehicle systems 22 for operation, or when the ICSS 10 operates independently from the vehicle systems 22. This means also that the memory 122 of the electronic unit 12 is configured for storing therein signals and data received from the I/O module 128 and/or from the vehicle systems 22.

FIG. 3 also presents a sensors module 130 that may be included in the electronic unit 12, and may be coupled in bi-directional communication to the processor 124. The sensors module 130 may include k different sensors k, where k=0, 1, 2, 3, . . . , n3, and n3 is a finite integer. There may thus be no sensor module 130 when k=0, or the sensor module 130 may have one sensor 130k when k=1, and so on. Each sensor 130k may be dedicated to a specific purpose.

The sensors module 130 has at least one sensor 130k for deriving sensor-data and for detecting at least one condition associated with potential dangers. The derived sensor-data is communicated to the vehicle systems 22 which are operative in the vehicle 20. The identity-data include only ICSS-data when no sensor-data are included therewith, or ICSS-data and also sensor-data. In other words, the electronic unit 12 is loaded with at least ICSS-data regarding the ICSS, which electronic unit 12 communicates that at least the ICSS-data from the ICSS 10 to the vehicle systems 22.

As an example only, a few sensors 130k integrated within the ICSS 10 are listed hereinbelow.

a. Buckle sensor: to reports if a tongue that is coupled to a belt or strap pertaining to the ICSS 10, is properly buckled or is unbuckled. A buckle may also be referred to as a release button.

b. Weight sensor(s): to measure the weight of the child present in the ICSS 10, to allow the vehicle systems 22 to check for weight appropriateness between the seated child and the ICSS 10 weight range thresholds provided by Seat limitations of ICSS-data. When incompatibility is detected, then a specific alert is delivered to the user. The buckle sensor and the weight sensor(s) may also serve to report if the ICSS 10 is empty or occupied. Hence, at least one sensor 130k derives if the child is present or absent from the ICSS. Alternatively, a load sensor may be used.

c. Inclination sensor: to reports the inclination of the ICSS 10 relative to the vehicle seat VS.

d. Contact sensor(s): to report the presence of the ICSS 10, proper mechanical installation of the ICSS 10 to a vehicle seat VSj of the vehicle 20, and/or verified proper installation of an ICSS 10 by checking for a connection between a base unit and a carrier unit.

e. Harness tension sensor(s): to detect slack in the tension of the straps of the ICSS 10.

f. Attachment sensor(s): to measure proper tension of the attachments coupled to the lower anchors, fixed to the body of the vehicle 20.

g. Orientation sensor: to detect the actual orientation of the ICSS 10, either front facing or rear facing, when both options are available. Alternatively, instead of using a sensor, the actual orientation of the ICSS 10 or direction of installation may be entered manually either via the I/O module 128 or via an I/O unit pertaining to the vehicle systems 22.

The k-number of sensors of the module 130 are sufficient to provide the vehicle systems 22 with ample data to take necessary measures and to provide warning signals in case a defect with or pertaining to the ICSS 10 is detected, which defect may possibly expose the child disposed therein to a potential or imminent danger.

FIG. 3 also shows a devices module 132 that may be included in the electronic unit 12, and which may be coupled in bi-directional communication to the processor 124. The devices module 132, may include m different operative devices 132m, where m=0, 1, 2, 3, . . . , n4, and n4 is a finite integer. There is thus not necessarily even any devices module 132 when m=0, or a devices module 132 having one or more operative devices 132m, so that such optional operative devices may be included in the ICSS 10 if desired.

The devices module 132 has at least one device 132m for deriving device-data and for providing at least one signal in response to potential dangers. The derived device-data is communicated to the vehicle systems 22 which are operative in the vehicle 20. The identity-data include only ICSS-data when no sensor-data and no device-data are included therewith, or ICSS-data together with one of both or both sensor-data and device-data.

An operative device 132m may possibly emit an alarm signal designed to attract attention and to provide a warning signal in case a triggering event is detected, such as a potential danger. This means that at least one device 132m may provide warning to a user about at least one potential danger. Assuming for example that an ICSS 10 is disposed in a vehicle seat VSj, also identified by the vehicle interface 24j, and that the presence of a child is detected in that ICSS 10 but that some restraint is detected to be deficient, then the device 132m may emit an alarm signal. Such an alarm signal may be an audible signal, a visual signal, or any other signal, and/or a combination of signals.

Another kind of device 132m may be dedicated to entertain the child or to keep him busy during travel in the vehicle 20. Other types of devices 132m may include harness pretension devices, restraint inflation devices, and even devices for the inflation of protective airbags.

Still another sort of device 132m is possibly a memory designed to store various types of data. For example, such a memory is used for the storage of the identity of the child riding in one specific ICSS 10, or of travel events, or crash data recordings, and the like. Alternatively, the memory 122 is used for the same purpose. With a device 132m, data may be loaded, unloaded, and organized via the I/O module 128.

The ability of the device(s) 132m, optionally included into the ICSS 10, to operate autonomously and independently from the vehicle systems 22 is a vital feature for certain types of ICSS 10. It is noted that for example with a simple and unsophisticated booster-type ICSS 10 there are no sensors, thus k=0, and there are no device(s) 132m, thus m=0. In this case, only the ICSS-data from the ICSS 10 are communicated to the vehicle 20. This allows the vehicle systems 22, and especially the seat belts system of the vehicle systems 22, to differentiate between a situation where the seat belt of the vehicle seat (VSj) is used by a grownup or used by a child seated in a booster seat. However, in a degraded version, where i of the memory items 122i being i=0, then an encoded signal from the identification unit discloses that the type of used ICSS 10 pertains to a booster-type, and when the vehicle interface 24j is designed to detect a connection with any part or portion of a booster seat, the vehicle systems 22 are able to conclude that a child is present in a vehicle seat VSj, as explained hereinabove.

The sensors module 130 and the devices module 132 are implemented as desired, thus are not limited to a specific sensor 130k and to a specific device 132m, respectively.

The ICSS 10 may be configured to operate in a variety of modes, such as in an independent mode of operation, to be independent from vehicle systems 22, or configured to work in an associated mode of operation, in association with the vehicle systems 22. The implementation of the ICSS 10 is possible in a plurality of combinations and configurations, even though not depicted.

Figure 4:
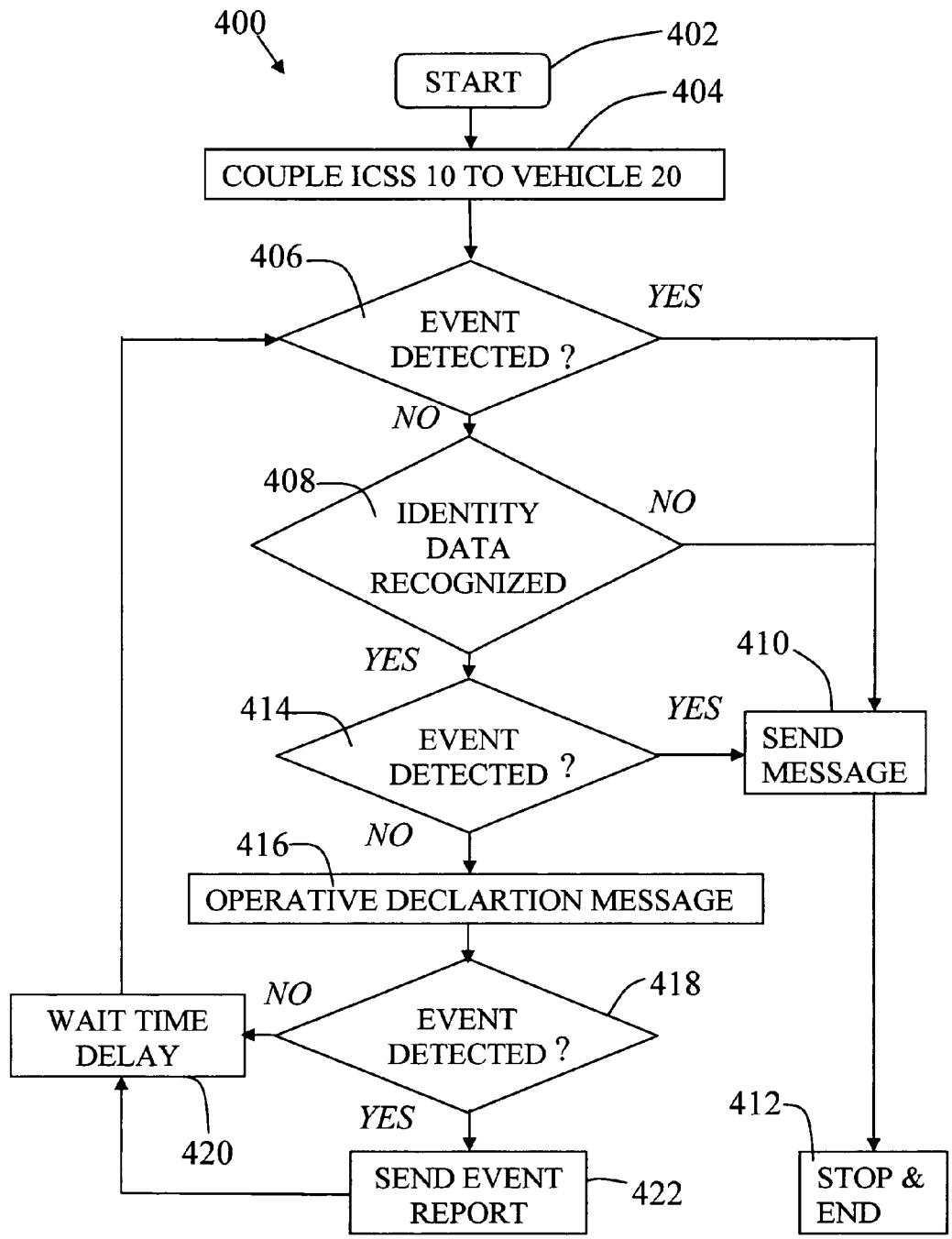
FIG. 4 is a flowchart shown as an example of the operation of the ICSS during the installation process.

FIG. 4 is a flowchart of an example of the installation and operation process of the ICSS 10.

Step 402 indicates the start of the installation process of the ICSS 10.

In step 404 it is to the user to properly mechanically restrain the ICSS 10 to the vehicle seat VSj, in the conventional manner. The mechanical coupling of the ICSS 10 is complemented by a wired or wireless communication coupling established between the child seat interface 14 and vehicle interface 24, to permit communication between ICSS 10 and the vehicle 20. The user thus couples the interfaces of the ICSS 10 to those of the vehicle 20. As described hereinabove, the coupling of the joint interface 40 is achieved by coupling both the joint mechanical interface 50 and the joint communication interface 60, which the user may achieve by at least one coupling operation.

Upon connection of the joint communication interface 60, the ICSS 10 seat installation instructions previously stored in the memory 122 are provided visually and/or audibly. For example, when first coupling the joint interface 40, when embedded in the top tether attachments, then after initial connection, the installation instructions for the ICSS 10 are presented. The user is given coupling instructions for the lower attachment and follow-on instructions for coupling of the top tether arrangements. The vehicle systems 22, operating on ICSS 10 based identity-data, or only on ICSS-data, may run a check for a CRS recall notice, or for an ICSS 10 crash-related flag stored in the memory 122, or for a CRS reuse notice, or for an ICSS 10 expiration date, or for any other dedicated messages, and provide an alert signal to the user.

Step 406 checks to detect the occurrence of an ICSS-coupling event, to ensure that all the interfaces of the ICSS 10 are all properly coupled, connected and operative. Optionally, integrated contact sensor(s) 130k pertaining to the sensors module 130 performs this task. If all is found to be right, flow control continues to step 408. Else, in step 410, a message is sent and the procedure is stopped and ended at step 412. Such a message is an instruction and/or a notification to a user regarding a detected ICSS-coupling problem.

It is in step 408 that the ICSS 10 identifies itself to the vehicle 20. Identity-data from the memory 122, including at least ICSS-data or also sensor-data from the sensor(s) 130k, and device-data from the operable device(s) 132m are communicated to the vehicle 20. If the vehicle 20 recognizes the received identity-data, then each one of the vehicle systems 22 receives specific required data, and control flow continues to step 414. Else, in step 410, a message is sent to notify and/or instruct the user about the detected problem, and the procedure is stopped and ended at step 412.

Step 414 checks to detect if a compatibility-event occurred, and to ensure that the ICSS 10 and the vehicle systems 22 of the vehicle 20 communicate and operate as required. Furthermore, step 414 may check to detect the compatibility between the ICSS 10 and the vehicle 20, between the ICSS 10 and the vehicle seat VSj to which the ICSS 10 is coupled, and between the ICSS 10 and the child occupying the ICSS 10. If no event is detected, then the next step is step 416, but else, control returns to step 410 where a message is emitted, and the procedure is stopped and ended at step 412. The user is now compelled to respond to the event(s) detected by the ICSS 10. For example, the user may be instructed to change the disposition of the ICSS 10 within the vehicle 20, or be instructed to correct a specific defect. Further technical messages may instruct technicians about the necessity to replace a defective component or unit.

In step 416, the operative status of the ICSS 10 is confirmed by a declarative message, possibly displayed, and/or sounded by the ICSS 10 and/or by the operative vehicle systems 22. Actually steps 406, 408 and 414, perform a function similar to a built-in-test, or BIT of the ICSS 10.

Step 416 thus visually and/or audibly confirms that the vehicle 20 recognizes the ICSS 10, thereby indicating proper reception of the identity-data and related data, such as information about the vehicle seat VSj occupied by the ICSS 10, and possibly information if the ICSS 10 is actually occupied by a child. The result of the recognition of the ICSS 10 is that, for example, the safety bags system of the vehicle 20 will operate according to the information received from the ICSS 10, and so will others, like the control modules activating the doors and the windows.

From step 416 flow control passes to step 418 in search for any vehicle event to be reported when the vehicle 20 carries a child occupying an ICSS 10. Step 418 checks to detect events particular to the operation of the vehicle 20. Examples of events that may be detected by the vehicle systems 22 are the detection of an imminent unavoidable collision, of a vehicle crash, of a vehicle 20 being parked while the driver's seat is empty, and of multiple other events. As another example, the electronic unit 12 may detect the unbuckling of the buckle of the ICSS 10 while a child is present therein. Evidently, the vehicle systems 22 and/or the electronic unit 12 may detect the same events as those detected by the vehicle systems 22 as well as different events.

When there is no event to report in step 418, then the operative status of the ICSS 10 is sampled after a predetermined time-delay designated by step 420, from where the process loops back to step 406, to check again that all of the steps, namely the condition steps 406, 408, and 414 are still fully operative and valid, that no events or potential dangers are reported. This includes a check of the condition of both the sensors 130k and the operable devices 132m if available, and of the messages received from the ICSS 10 and from the vehicle systems 22. Should an event be detected in step 418, then control flows to step 422.

Step 422 emits a message when a vehicle 20 event is detected. A message, in response to the steps 410 and 416, may send one or more alert warning signals perceptible and recognizable by a user, who may be required to take appropriate corrective step(s) to remedy a dangerous situation. Alternatively, one or more instruction signals are communicated to the appropriate vehicle systems 22.

From step 422 control flows back to step 420, and after a predetermined delay, returns to step 406 for a renewed check of the condition steps 406, 408, and 414. As mentioned hereinabove, the ICSS 10 may serve as an indicator for the vehicle systems 22, and is thereby dependent on the operation of the vehicle 20. The ICSS 10 identity-data may be recorded by an Event Data Recording system pertaining to the vehicle systems 22.

There is thus provided a method allowing vehicle systems 22 of a vehicle 20 to derive at least into which specific vehicle seat VSj out of vehicle seats VS an intelligent child safety seat 10, or ICSS 10 is disposed. The method comprises the following steps. First, providing the ICSS with a joint interface 40 including vehicle interfaces 24 and a child seat interface 14, and second, providing the child seat interface with at least one child seat communication interface 16C. Third, providing a vehicle interface 24*j* out of the vehicle interfaces 24 pertaining to the vehicle 20, the vehicle interface 24*j* having at least one vehicle communication interface 26C associated with one vehicle seat VSj. Last, coupling the at least one child seat interface 14 to the at least one vehicle interface 24*j*, whereby the vehicle systems recognize the vehicle interface 24*j* and derive to which specific vehicle seat VSj the ICSS 10 is coupled.

As described hereinabove, coupling of the joint interface establishes communication between an electronic unit 12 coupled to the child seat interface 14, and the vehicle systems coupled to vehicle interface 24*j*. Moreover, the child seat interface 14 further includes at least one child seat mechanical interface 16M.

In addition, the vehicle interface 24 further includes at least one vehicle seat mechanical interface 26M.

Optionally, the description hereinabove recites a method allowing vehicle systems 22 of a vehicle 20 to derive at least into which specific vehicle seat VSj out of vehicle seats VS an ICSS 10 or a CRS 70, is disposed. The method comprises the following steps. First, providing the ICSS or the CRS with at least one child seat mechanical interface 16M pertaining to and configured for coupling the ICSS or the CRS, respectively, into the vehicle. Next, providing a vehicle interface 24*j* out of vehicle interfaces 24 having at least one vehicle communication interface 26C associated with one vehicle seat VSj. Last, coupling the at least one child seat mechanical interface 16M to the at least one vehicle interface 24*j*, whereby the vehicle systems recognize the vehicle interface 24*j* and derive to which specific vehicle seat VSj the ICSS 10 or the CRS 70, is coupled.

The implementation of an ICSS 10 is simple enough for persons skilled in the art so that further details are superfluous. Moreover, although the description provided hereinabove relates to communication initiated by the ICSS 10, the same is true for communication initiated by the vehicle systems 22. Thus in both cases, implementation is straightforward to those skilled in the art and does not require further details. Multiple and obvious ways for the integration and joint operation of the joint interface 40, the electronic unit 12 and in particular of the memory 122 are readily apparent. It is obvious to those skilled in the art that loaded ICSS-data can be organized in multiple and varied ways. It is noted that not all possible items of the ICSS-data are described hereinabove and more items are permitted to be loaded into the memory 122 of the electronic unit 12. The ICSS 10 may be configured for storing therein signals and data received from the I/O module 128 and/or from the vehicle systems 22.

A CRS 70, integrated with sensors and/or devices communicating with vehicle system is not and cannot be function as an ICSS 10, but any CRS 70 becomes an ICSS 10 when loaded with at least one item of datum of ICSS-data. As mentioned hereinabove, the identity-data of an ICSS 10 include only ICSS-data, or ICSS-data together with at least one of sensor-data and device-data. The identity-data is stored in the memory 122 of the ICSS 10 but is also configured to be stored in a safety data memory of the vehicle 20. In the same manner, the identity-data is processed by either a processor dedicated to the ICSS 10 or a processor dedicated to the vehicle systems 22.

It is understood that the scope of safety applications facilitated by the ICSS 10 may vary depending on the available items of ICSS-data, provided sensor(s) 130*k*, provided device (s) 132*m* and provided vehicle systems 22.

In use, the ICSS 10 is operated in the same manner as a conventional child restraint system 70. However, on top of the mechanical coupling of the ICSS 10 to the vehicle 20, a joint communication interface 60 plug-in between the child seat interface 14 and the vehicle interface 24 may be required. It is noted that coupling the joint mechanical interface 50 and the joint communication interface 60 may be carried out as one or more separate activities. Also, depending on the implementation level of the ICSS 10, an I/O unit may be included therewith for interaction with a user.

Industrial Applicability

The ICSS is well suited for production in industry according to the methods described hereinabove.

It will be appreciated by persons skilled in the art, that the present invention is not limited to what has been particularly shown and described hereinabove. For example, the ICSS 10 may also be configured to provide safety to grownups, and especially so for people having disabilities of any kind. Rather, the scope of the present invention is defined by the appended claims and includes both combinations and sub-combinations of the various features described hereinabove as well as variations and modifications thereof which would occur to persons skilled in the art upon reading the foregoing description.

What is claimed is:

1. An Intelligent Child Safety Seat (ICSS) including a child seat interface for coupling the ICSS in at least data communication with vehicle systems of a vehicle, the ICSS comprising:
    an electronic unit comprising a non-transitory computer-readable memory storing therein seat installation instructions of manufacturer's specifications particular to the ICSS,
    wherein the data stored in the memory is receivable by the systems of the vehicle via a joint interface to control a function of presenting the seat installation instructions to a user as at least one of visually-presented installation instructions and vocally sounded installation instructions.

2. The ICSS according to claim 1, wherein the vehicle system are configured for real-time monitoring of an installation of the ICSS by retrieval of interactive seat installation instructions.

3. The ICSS according to claim 1, wherein the seat installation instructions include a user guide for the ICSS.

4. The ICSS according to claim 1, wherein the vehicle systems load the memory with at least one of a crash-related flag indicating that the ICSS was involved in a crash, a product recall announcement for the ICSS, and an amended expiration date received from a manufacturer of the ICSS, and wherein the vehicle systems are operable to perform at least one of functions comprising:

activating a warning to indicate that the ICSS is being used after being involved in the crash, activating a warning to indicate a match between information stored in the memory which identifies a seat model of the ICSS and the product recall announcement for the ICSS, activating a warning to indicate that the expiration date for the ICSS has passed in response to a detection of an expiration date of the ICSS stored in the memory, and activating a warning to indicate that the ICSS expiration date was amended.

5. The ICSS according to claim 1, wherein the memory further stores therein child identity data of the child riding in the ICSS, wherein the child identity data is stored in the memory by a user loading and unloading data via an I/O module of the electronic unit.

6. The ICSS according to claim 5, wherein the vehicle systems activate a warning to the user upon detection of a mismatch between the child identity data and information stored in the memory which identifies limit values of the ICSS by at least one of a child age range, a child weight range, and a child height range.

7. The ICSS according to claim 5, wherein the I/O module permits bi-directional communication of data, via a processor, between the memory and external systems.

8. The ICSS according to claim 5, wherein: the memory stores information which identifies at least one of an ICSS mass group of the ICSS and a size class of the ICSS, and the vehicle systems activate a compatibility check to warn the user when at least one of the ICSS mass group and the size class of the ICSS are not compatible with the child identity data.

9. The ICSS according to claim 1, wherein the vehicle systems activate a warning to the user upon detection of a mismatch between a child weight range of the ICSS and a weight limit of a vehicle interface.

10. The ICSS according to claim 1, wherein:

the memory stores information which identifies a manufacturer of the ICSS, and the vehicle systems activate a warning to the user when the manufacturer of the ICSS is not included in a list of manufacturers of child restraint systems approved by a regulatory agency or by a manufacturer of the vehicle.

11. The ICSS according to claim 1, wherein:

the memory stores information which identifies an ICSS specific category, and the vehicle systems activate a compatibility check to warn the user when the category of the ICSS selected from a group of categories consisting of Universal, Semi-universal, Vehicle-specific, and Restricted, is not compatible with at least one of the vehicle and a specific vehicle seat (Vsj).

12. The ICSS according to claim 1, wherein:

the child seat interface is operatively coupled to a vehicle interface, and communication between the ICSS and the vehicle systems is achieved by at least one coupling operation of top tether arrangements when (i) the vehicle interface is configured as a vehicle communication interface embedded in a top tether anchorage of a vehicle mechanical interface, and (ii) the child seat interface is configured as a child seat communication interface embedded in top tether hardware of a child seat mechanical interface.

13. The ICSS according to claim 1, wherein:

the memory stores information which identifies seat dimensions of the ICSS when the ICSS is at least one of empty and occupied, and the vehicle systems perform at least one of suppression and deployment of airbag(s) relative to the child based on at least the seat dimensions.

14. The ICSS according to claim 1, wherein the vehicle systems store, in the memory, at least one of travel events and crash data recordings.

15. An Intelligent Child Safety Seat (ICSS) configured to provide a user desiring to install the ICSS in a vehicle seat with seat installation instructions specific to the ICSS, the ICSS having an electronic unit comprising:

a non-transitory computer-readable memory having stored therein the seat installation instructions specific to the ICSS, the seat installation instructions being stored as at least one of audible information and visual information, and a device for presenting the seat installation instructions to the user as at least one of visually presented installation instructions and vocally sounded installation instructions.

16. The ICSS according to claim 15, wherein:

the seat installation instructions include a user guide for the ICSS stored as at least one of the audible information and the visual information, and the user guide is configured to present a manufacturer's specifications particular to the ICSS.

17. The ICSS according to claim 15, wherein the memory comprises at least one of an independent memory and a memory pertaining to the device.

18. The ICSS according to claim 15, wherein:

the ICSS is configured for interaction with at least one user, and the electronic unit includes an I/O module through which data is loadable and unloadable into and out of the memory by the user, the data including at least an identity of a child riding in the ICSS.

19. The ICSS according to claim 15, wherein:

the ICSS comprises a child seat interface for coupling the ICSS at least in data communication with vehicle systems of a vehicle, and the seat installation instructions are communicated to the vehicle systems.

20. The ICSS according to claim 15, wherein the device comprises an entertainment device.

* * * * *